Nov. 30, 1926.

J. L. PEAVY

CLUTCH PEDAL OPERATOR

Filed May 3, 1926

John L. Peavy
Inventor,

Nov. 30, 1926. 1,608,992
J. L. PEAVY
CLUTCH PEDAL OPERATOR
Filed May 3, 1926 2 Sheets-Sheet 2
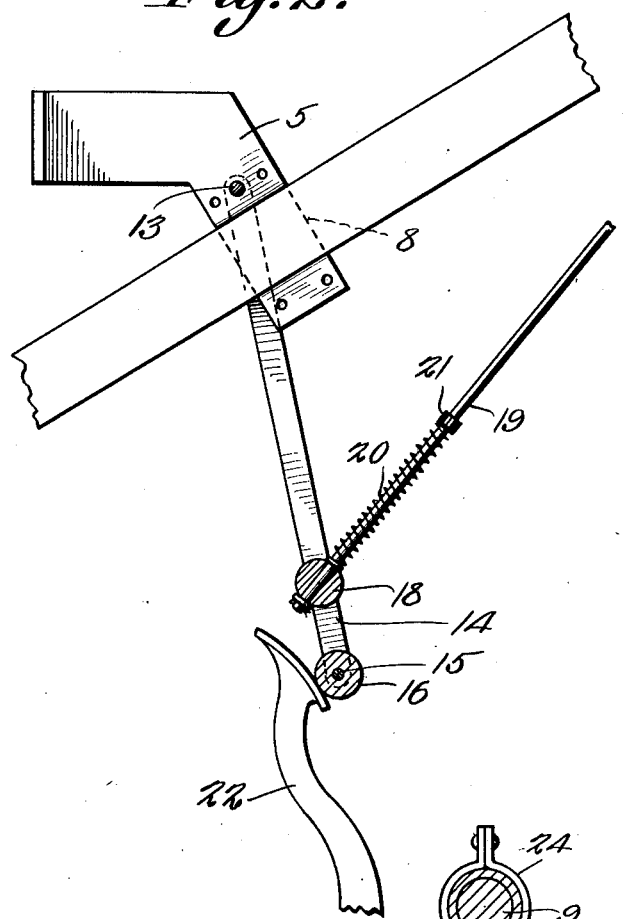
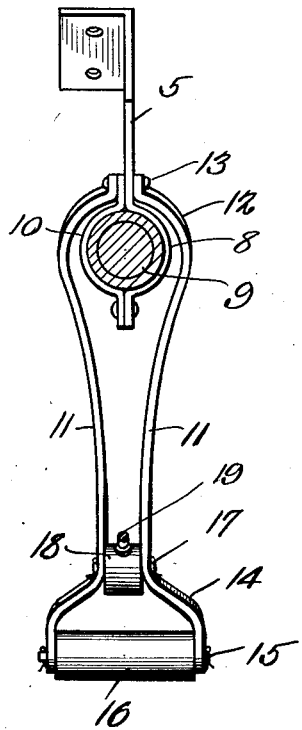
John L. Peavy
Inventor
By C. A. Snow & Co.
Attorneys Patented Nov. 30, 1926.

1,608,992

UNITED STATES PATENT OFFICE.

JOHN L. PEAVY, OF POTTERSDALE, PENNSYLVANIA, ASSIGNOR OF ONE-THIRD TO JEROME T. McGONIGAL, OF POTTERSDALE, PENNSYLVANIA, AND ONE-THIRD TO AIRY L. SHOPE, OF KARTHAUS, PENNSYLVANIA.

CLUTCH-PEDAL OPERATOR.

Application filed May 3, 1926. Serial No. 106,442.

The present invention has reference to a clutch pedal operating device designed for use in connection with a well known type of motor vehicle, the primary object of the invention being to provide novel means whereby the pedal may be operated by the movement of a hand lever disposed adjacent to the steering wheel of the vehicle.

Another object of the invention is to provide means whereby the pedal may be moved to bring low gear into operation, and held in such position, thereby relieving the operator of the responsibility of holding the pedal to operate low gear, in ascending a long grade.

A still further object of the invention is to provide a device of this character which may be readily and easily installed on the usual motor vehicle, eliminating the necessity of making alterations in the motor vehicle construction to position the device.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made without departing from the spirit of the invention.

Referring to the drawings:

Figure 2 is an enlarged sectional view through the swinging arm carrying the pedal engaging member.

Figure 3 is a sectional view taken on line 3—3 of Figure 1.

Figure 4 is a sectional view taken on line 4—4 of Figure 1.

Figure 1:
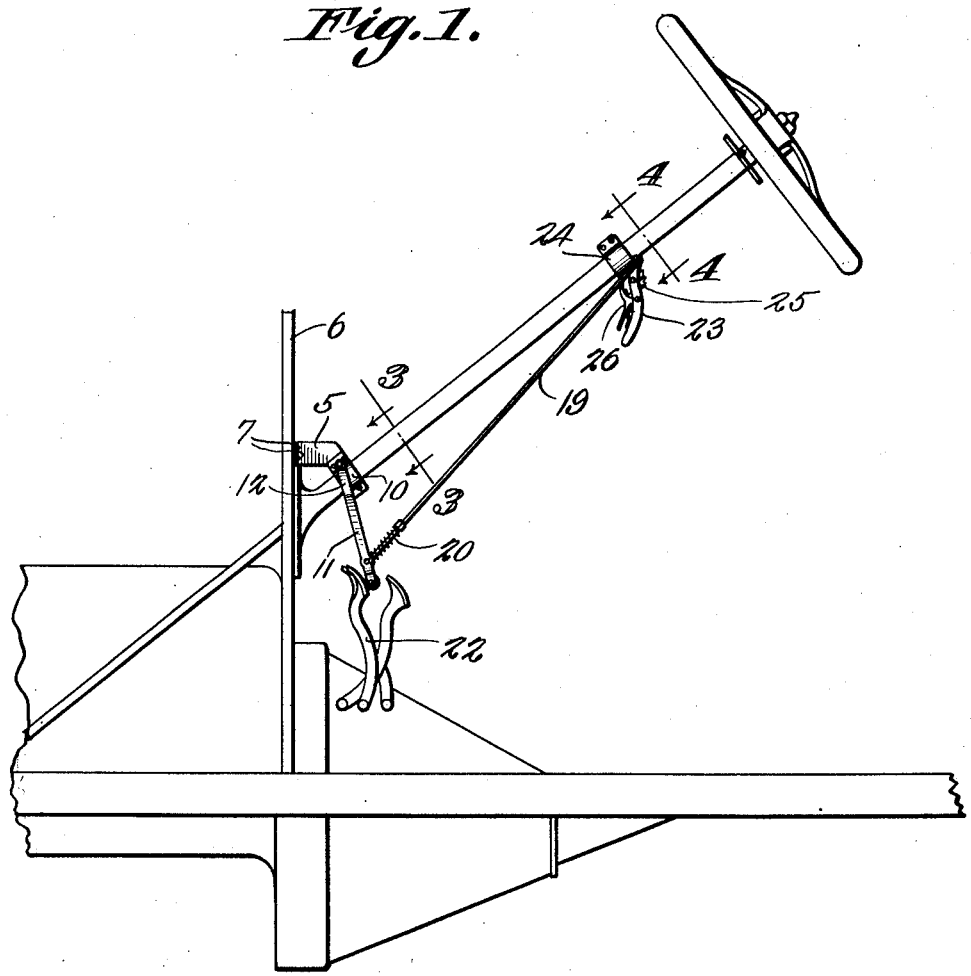
Figure 1 is an elevational view of the device and illustrating the manner of mounting the device.

Referring to the drawings in detail, the device includes an arm 5 or bracket, which is secured to the dash board 6 of the vehicle, by means of bolts 7.

This arm 5 is formed with a curved portion 8 adapted to be positioned around the steering column, which in the present showing is indicated at 9, there being provided a curved member 10 cooperating with the curved portion 8 for securing the arm to the steering column.

Pivotally connected with the arm 5 are the spaced arms 11 that have curved ends 12 fitted around the steering column, the inner ends thereof being pivotally connected to the arm 5, at 13. These arms 11 have outwardly extended portions 14, which are connected by means of the shaft 15 on which the roller 16 is mounted, the roller being designed to engage the clutch pedal to operate the same.

The reference character 17 indicates stub shafts that pass through the arms 11 at points adjacent to the outwardly extended portions 14 thereof, which shafts form a part of the head 18, and on which the head swings. The head 18 is formed with an opening through which the rod 19 extends, which rod constitutes the actuating rod of the device.

Positioned on the rod 19, is a coiled spring 20 that has its upper end engaging the collar 21 adjustably secured on the rod 19 as clearly shown by Figure 2 of the drawings, the opposite end thereof engaging the head 18 to restrict movement of the rod 19 through the head, and relieve the rod 19 of undue strain should the pedal engaged by the roller 16, and which is indicated by the reference character 22, become caught.

The upper end of the rod 19 has pivotal connection with the lever 23 which in turn is pivotally connected with the securing member 24 that is secured around the steering column as clearly shown by Figure 4.

A curved rack indicated at 25 forms a part of the securing member, which is adapted to be engaged by the pawl 26 carried by the lever 23, so that when the lever 23 is moved to a predetermined position, the latch will be held in such position, until manually moved.

From the foregoing it will be obvious that due to the construction shown and described, the clutch pedal of the vehicle which is engaged by the roller 16, may, by moving the lever 23 to operate the rod 19, be moved to the limit of its downward movement, throwing the low gear into operation, and should it be desired to hold the low gear in operation, when the machine is ascending a long grade, the lever may be held in such position by the pawl 26.

Should it be desired to operate the vehicle, by the mechanism shown and described, it will be seen that after the low gear has been moved into operation, the operator may, by releasing the pawl to allow the pedal to move to the limit of its reverse direction, to bring the high gear into operation.

I claim:—

1. In a motor vehicle pedal operating device, a pivoted member including a pair of arms supported adjacent to a clutch pedal, a roller connected with the arms, said roller adapted to rest on the clutch pedal, a rod pivotally supported adjacent to the steering column of the vehicle and connected with the pivoted member, and a hand lever for operating the rod and pivoted member.

2. In a device of the character described, a pivoted member having a roller mounted on its free end to engage a clutch pedal, a rod connected with the pivoted member, a hand lever connected with the rod for moving the rod to move the pivoted member to force the clutch pedal downwardly, and said hand lever adapted to be secured against movement.

In testimony that I claim the foregoing as my own, I have hereto affixed my signature.

JOHN L. PEAVY.